US011714182B1

(12) United States Patent
Regens et al.

(10) Patent No.: US 11,714,182 B1
(45) Date of Patent: Aug. 1, 2023

(54) ARTIFICIAL INTELLIGENCE-ENHANCED REAL-TIME AERIAL OBJECT CLASSIFICATION AND TRAJECTORY FORECASTING USING DIGITAL RADAR SIGNALS

(71) Applicants: James L. Regens, Nichols Hills, OK (US); Quint D. Avenetti, Rockwall, TX (US)

(72) Inventors: James L. Regens, Nichols Hills, OK (US); Quint D. Avenetti, Rockwall, TX (US)

( * ) Notice: Subject to any disclaimer, the term of this patent is extended or adjusted under 35 U.S.C. 154(b) by 0 days.

(21) Appl. No.: 18/063,513

(22) Filed: Dec. 8, 2022

(51) Int. Cl.
*G01S 13/58* (2006.01)
*G06N 20/00* (2019.01)
*G06F 18/24* (2023.01)

(52) U.S. Cl.
CPC ............ *G01S 13/589* (2013.01); *G06F 18/24* (2023.01); *G06N 20/00* (2019.01)

(58) Field of Classification Search
CPC ........ G01S 13/589; G06F 18/24; G06N 20/00
See application file for complete search history.

(56) References Cited

U.S. PATENT DOCUMENTS

2021/0158128 A1\* 5/2021 Purica .................. G08G 5/0026

\* cited by examiner

*Primary Examiner* — Timothy A Brainard
*Assistant Examiner* — Helena H Seraydaryan
(74) *Attorney, Agent, or Firm* — GableGotwals (57) ABSTRACT

A component-based system and method for rapidly generating artificial intelligence-enhanced real-time, multi-dimensional gridded aerial object classification and trajectory (state and orbital state vector) forecasts utilizing digital radar signals data collected at high rates of volume and velocity. The system performs data storage, retrieval, manipulation, communication, processing, and end user application tasks for accurate aerial object classification and vector forecasts. The data component serves as a data cache to store, retrieve, and manipulate data utilizing a plurality of functions under conditions of variable internet connectivity. The processing component includes an artificial intelligence machine learning component and logic for manipulating the data to generate gridded projections that are arrayed spatially and temporally. A post-processing component allows users to receive and retrieve automated predictions in a format suitable for end user application to automatically support and enhance the accuracy of aerial object classification and vector forecasts for aviation, aerospace, and ballistic applications.

18 Claims, 2 Drawing Sheets

ARTIFICIAL INTELLIGENCE-ENHANCED REAL-TIME AERIAL OBJECT CLASSIFICATION AND TRAJECTORY FORECASTING USING DIGITAL RADAR SIGNALS

BACKGROUND

This disclosure is in the field of systems and methods that facilitate the use of computer implemented task management for rapidly generating artificial intelligence-enhanced real-time, multi-dimensional (space and time) gridded aerial object classification and trajectory (position, navigation, and timing or PNT) forecasts, including manned and unmanned ariel objects operating at subsonic, sonic, supersonic, and hypersonic speeds. The exemplary, illustrative technology herein has applications to supporting and enhancing the accuracy of aerial object classification and trajectory forecasts for aviation, aerospace, and ballistic applications.

The state of the art for signal processing for radar systems encompasses numerous techniques and touches on many application areas to detect and locate objects. Radar imaging provides quantitative data on multiple parameters such as but not limited to range, speed, azimuth and elevation angles, enabling target detection and localization. Classic radar missions include air, maritime, ground traffic control/monitoring; weather forecasting; ocean current monitoring; urban sensing; ground imaging; and indoor monitoring. Radar accomplishes this by emitting radio waves (Transmit—T element), capturing the return signal (Receive—R element) with sensor arrays, and aggregating the TR elements by beamforming to create a final beamformed image.

Digital radars ("DR") differ from analog systems, most notably by having a unique code for each transmit signal. This is a key element of digital code modulation ("DCM"), allowing radars to distinguish their own signal from multiple other signals in congested environments. Radio frequency ("RF") pulse waveforms in a digital radar architecture are generated digitally in the transmitter and target returns are digitized without analogue down-conversion in the receiver, thereby eliminating analogue components traditionally found in radar systems.

Modern advanced radar systems are challenged on a number of fronts, with additional operational requirements including a need to support multifunction processing and dynamic mode adjustment. Moreover, recent changes in frequency allocations have resulted in many radar systems potentially operating in close proximity to communications infrastructure and other spectrally demanding systems. Spectrum congestion and need for higher dynamic range problems compound so radar systems need to be run-time adaptable to suit their environmental and operational requirements driving the goal of creating an all-digital cognitive radar system.

Therefore, new methods of processing information and rapidly generating accurate aerial object classification and trajectory (state vector) forecasts, including orbital state vector in cislunar space, are needed in order to produce the desired real-time analysis and predictions for applications such as aerospace, aviation, and ballistics. For the purposes of this disclosure, cislunar space is the region of space from the Earth out to and including the region around the surface of the Moon. This distance may be upwards of 12 GEO from the center of the Earth (where 42,164 km=1 GEO), the distance between the Earth and Moon being on average 9.12 GEO (384,402 km).

SUMMARY

Embodiments of this disclosure utilize a component-based computer implemented system to generate and process multi-dimensional gridded predictions with or without reliance on internet connectivity to automatically support and enhance the accuracy of computationally complex but tractable aerial object classification and trajectory (state vector or orbital state vector) forecasts such as but not limited to aviation, aerospace, and ballistic applications of air and ground moving target indicators. The target grid may lie in tropospheric space, stratospheric space, mesospheric space, thermospheric space, geospace, or cislunar space. The cislunar space may be upwards of 12 GEO. Non-transitory computer readable medium storing machine readable code or instructions which, when executed by one or more processors, causes a desktop computer, notebook, tablet or other electronic computing device to implement the methods of this disclosure.

The embodiments overcome the challenges to utilization of cognitive all-digital radar arrays and, therefore, offer substantial benefits for defense and civilian radar systems. For example, inclusion of a learning component helps to execute better actions and adapt its operational parameters based on the ability to take advantage of all the available degrees of freedom and sources of diversity including location, frequency, code, beam patterns, revisit time, pulse repetition frequency ("PRF"), polarization, and cislunar perturbations when choosing future actions. Embodiments with respect to real-time aerial object classification and state vector and orbital state vector forecasting are exemplified but not limited to actions cognizant of low-observable targets, individual drones or swarms of unmanned aerial systems ("UASs"), dense and contested spectrum use, and adversarial activities. The most relevant enabling technologies of cognitive radar are adaptive waveform design, numerical optimization, RF System-on-Chip ("RFSoC"), all-digital radar arrays, artificial intelligence-based machine learning ("ML"), and deep learning.

Use of statistical signal processing and ML techniques applied to rapidly generate accurate real-time, multi-dimensional gridded aerial object classification and state or orbital state vector PNT forecasts derived from digital radar signals data collected at high rates of volume and velocity overcomes the challenges faced by the prior art and further advance the state of the art. ML is an enabling technology for signal processing, recognition and classification of radar emitters, processing and classification of radar images, noise suppression in the radar image, automatic target recognition ("ATR"), target detection, anti-jamming techniques, adaptive waveform design, dynamic antenna array selection, cognitive electronic warfare ("CEW"), reconstruction from measurements with missing data, high-resolution Direction of Arrival ("DOA") estimation, and cognitive radar systems. In general, an AI-based ML component of this disclosure provides a more rapid, accurate and automated system and method to improve digital radar environmental awareness for rapidly detecting and classifying aerial objects and forecasting vectors.

Embodiments of this disclosure provide an integrated system that includes a set of four integrated components and associated processes implemented by non-transitory computer readable medium containing instructions for performing data storage, retrieval, manipulation, communication, processing, and end user application tasks for rapidly generating artificial intelligence-enhanced real-time, multi-dimensional gridded ariel object classification and trajectory forecasts utilizing digital radar signals data collected at high rates of volume and velocity. The system uses this collected, synthesized, and processed digital radar signals data to rapidly correct and update ariel object classification and vector forecasts generated by the system, including manned and unmanned ariel objects operating at subsonic, sonic, supersonic, and hypersonic speeds. Two or more components of the system may interface for performing tasks using a computer implemented system of components or modules that contain data and a collection of related software structures and procedures.

In embodiments, the data component serves as a data cache to store, retrieve, and manipulate georeferenced and time-referenced digital radar signals data, map coordinate data, other data information, post-processing data, and ML algorithms and software utilizing a plurality of functions under conditions of variable internet and non-internet connectivity. It also contains a communications component that interacts with the other components as well as receive various localized digital radar sensor data. The data component can include one or more servers or external hard drives for data storage to function as a data cache for pre-processed and post-processed data and software including ML algorithms wherein the database includes digital radar sensor data, map coordinates, and other archived information configured in a structured format as an array comprising one or more georeferenced locations for a set of time-defined intervals within a cluster source meeting spatial and temporal characterization parameters for a suspect target grid for each digital radar signal element in the database.

The processing component includes a data normalization module, accuracy improvement and verification module, an AI-based ML aerial object classification module, an AI-based ML trajectory forecasting module, and logic for manipulating the digital radar sensor data derived from space-based, airborne, maritime, and ground radar systems in conjunction with map coordinate data, other data information, and post-processing data to generate, rapidly correct, and update aerial object detection, classification, and trajectory forecasts arrayed spatially and temporally when exposed to data sets. The artificial intelligence machine learning processing component may include a normalization module, an accuracy improvement and verification module, a classification module, and a forecasting module and associated logic for manipulating data including real-time and near real-time digital radar signals data, prior predictions, previously discarded data as a constraining element and/or anomaly of value, and interpolated values to generate multi-dimensional gridded aerial object classifications and trajectory forecast predictions. Each predicted value is georeferenced for a time-defined intervals and configured in a structured format to populate an array comprising one or more georeferenced locations for a set of time-defined intervals within a cluster source meeting spatial and temporal characterization parameters for a suspect target grid for each element in the database.

An information distribution and alerting component allows users to receive and retrieve automated aerial object classification and vector forecasts from the data repository in a format suitable for end user application. Embodiments may further include a notebook or desktop computer with graphical user interface that encapsulates the architecture for and functions as the single point of access to technical execution of the standardized tasks within or between components and masks the complexity of the execution of the tasks allowing the architecture to exist as an autonomous unit, thus allowing internal changes to be made to the architecture with minimal impact to application.

A communication component transmits and receives data and software including ML algorithms to/from the data component for manipulation by the processing component; receives requests for and transmits archived data from the artificial intelligence machine learning processing component to the information distribution and alerting component for end user application; and is capable of generating a historical record of completed tasks. In embodiments, the information distribution and alerting component has functionality to receive and retrieve automated georeferenced and time-referenced predictions with a relative or weighted confidence value to automatically support and enhance the accuracy of ariel object classifications and vector forecasts, including manned and unmanned aerial objects operating at subsonic, sonic, supersonic, and hypersonic speeds.

In embodiments of a method for generating an artificial intelligence-enhanced real-time, multi-dimensional gridded aerial object classification and vector forecast for one or more manned and unmanned aerial objects operating at subsonic, sonic, supersonic, or hypersonic speeds within a target grid, the method utilizing digital radar signals data and including:

storing in a data component a data cache containing real-time or near real time pre-processed and post-processed digital radar signals data, including interpolated digital radar signals data, and archived endogenous information including prior pre-processed and post-processed digital radar signals data, position constant georeferenced x, y & z coordinates, previously discarded digital radar signals data, prior multi-dimensional gridded aerial object classifications and vector forecast predictions, and map coordinates stored in an array, each element of the array being time-referenced and geo-referenced, the data cache further comprising software containing machine learning algorithms;

manipulating the data cache to generate the multi-dimensional gridded aerial object classification and vector forecast, the multi-dimensional gridded aerial object classification and vector forecast including a confidence value, the manipulating comprising an artificial intelligence machine learning processing component including a normalization module, an accuracy improvement and verification module, a classification module, and a forecasting module and associated logic;

receiving data requests from the artificial intelligence machine learning process component, transmitting the data requests to the data component, receiving requested data from the data component, and transmitting the requested data to the artificial intelligence machine learning process component by way of a communications component, the communications component further transmitting the multi-dimensional gridded aerial object classification and vector forecast predictions to an information distribution and alerting component; and receiving the multi-dimensional gridded aerial object classification and vector forecast in an information distribution and alerting component, the information distribution and alerting component presenting the multi-dimensional gridded aerial object classification and vector forecast in accordance with a predetermined end user requirement; and displaying the multi-dimensional gridded aerial object classification and vector forecast on a computer-implemented graphical user interface in communication with the data component, the artificial intelligence machine learning processing component information distribution and alerting component, and the communications component.

In embodiments of the method, the method operates under full internet connectivity, degraded internet connectivity, and no internet connectivity. When the system has full internet connectivity, the real-time or near-real time pre-processed and post-processed digital radar signals data is used for initial input from the data component to populate the artificial intelligence machine learning processing component. When the system has degraded internet connectivity, a subset of the real-time or near real time pre-processed and post-processed digital radar signals data, if available, and the endogenous archived information are used for initial input from the data component to populate the artificial intelligence machine learning processing component. When the system has no internet connectivity, only the endogenous archived information and the position constant georeferenced x, y & z coordinates are used for initial input from the data component to populate the artificial intelligence machine learning processing component.

In embodiments, the method is executed by non-transitory computer readable medium comprising instructions that, when executed on one or more microprocessors, carry out the method and display the multi-dimensional gridded aerial object classification and vector forecast on one or more end user computing devices.

NUMBERING AND ELEMENTS USED IN THE DRAWINGS

10 Computer-Implemented Graphical User Interface
20 Internet Connectivity State
20a Full Internet Connectivity
20b Degraded Internet Connectivity
20c No Internet Connectivity
30 Data Component
30a Digital Radar Data Source
301a Spaced-based Sensor Radar
301b Airborne Radar
301c Ground Radar
301d Maritime Radar
30b Map Coordinate Source
30c Other Information Data Source
30d Post-Processing Data Archive
30e ML Algorithms and Software Archive
40 AI-based ML Processing Component
40a Normalization Module
40b Accuracy Improvement and Verification Module
40c Classification Module
40d Forecasting Module
50 Communication Component
60 Information Distribution and Alerting Component

DETAILED DESCRIPTION

A component-based system of this disclosure provides for rapidly generating artificial intelligence-enhanced real-time, multi-dimensional (space and time) gridded aerial object classification and trajectory (state vector and orbital state vector including position, navigation, and timing) forecasts utilizing digital radar signals data collected at high rates of volume and velocity. The digital radar data are often non-stationary (i.e., data distribution is changing over time) because of the high velocity of signals information being generated. The system uses this collected, synthesized, and processed data to rapidly correct and update aerial object classification and trajectory forecasts generated by the system. In embodiments, the system includes a set of four integrated processes for performing data storage, retrieval, manipulation, communication, processing, and end user application tasks for accurate aerial object classification and vector forecasts. Two or more components may interface for performing tasks. The data component serves as a data cache to store, retrieve, and manipulate data utilizing a plurality of functions under conditions of variable internet connectivity. It also contains a communications component that transmits and receives data to/from the data component for manipulation by the processing component. The processing component includes an artificial intelligence machine learning component and logic for manipulating the data to generate gridded projections that are arrayed spatially and temporally. A post-processing component allows users to receive and retrieve automated predictions in a format suitable for end user application to automatically support and enhance the accuracy of aerial object classification and vector forecasts for aviation, aerospace, and ballistic applications.

Embodiments of this disclosure provide an integrated system that includes a set of four components and associated integrated processes implemented by non-transitory computer readable medium containing instructions for performing data storage, retrieval, manipulation, communication, processing, and end user application tasks for rapidly generating accurate aerial object classification and vector forecasts are needed in order to produce the desired real-time analysis and predictions for applications such as aerospace, aviation, and ballistics. Two or more components (i.e., servers) may interface for performing tasks. This is accomplished by using a computer implemented system of components or modules that contain data and a collection of related software structures and procedures. Each of the components is further operably connected to networking and communications interfaces appropriate to the deployed configuration. The system contains both data and a collection of structures and procedures, so each discrete component encapsulates a package of data, structures, or procedures. An individual component can be visualized simultaneously as self-sufficient or autonomous since it does not require other additional structures, procedures, or data to perform its specific tasks and also linked to one or more other components to produce an aggregated output based on a combination of those tasks.

The one or plural logical servers (i.e., components) include in one illustrative embodiment: a first server (including a data component) is data archive/repository; a second server (including the AI-based ML data processing component) with a data normalization module, accuracy improvement and verification module, object classification module, and vector forecasting module for modeling and prediction;

a third server (including a communication component); and a fourth server (including an information distribution and alerting component). Each exemplary server may be implemented as an individual computer system, a collection of computer systems, a collection of processors, or the like, either tightly or loosely clustered, a set of interacting computer systems that are not clustered, or other arrangement as deemed appropriate by those with skill in the art. Computer systems can be implemented using virtual or physical deployments, or by using a combination of these means. In some implementations, the servers may be physically located together, or they may be distributed in remote locations, such as in shared hosting facilities or in virtualized facilities (e.g., "the cloud").

The system as described collects and utilizes digital radar ("DR") sensor information collected at high rates of frequency (volume and velocity), categorized as either a 2-body problem or a 3-body problem, to generate system outputs. This functional organization of components is provided for illustrative purposes; it is contemplated that other functional organizations may be implemented using the techniques described herein. The functions of the servers may be combined into fewer servers, or expanded so that there is a plurality of physical servers without deviating from the described system. Each of the four components (30, 40, 50, and 60) has access to external data sources and internal or system data sources from the system database (30a, 30b, 30c, 30d) or from databases operating on one or more of the four servers as is required to perform the necessary data collecting, data clean up and pre-processing, classification, modeling, forecast generation, and the like. Input and output data is processed and modeled in real time, in a time delayed mode, and in batch mode, respectively, either simultaneously or asynchronously, and shared (50) between system components on various servers using network communications, notifications, messages, common storage, or other means in common use for such purposes.

Figure 1:
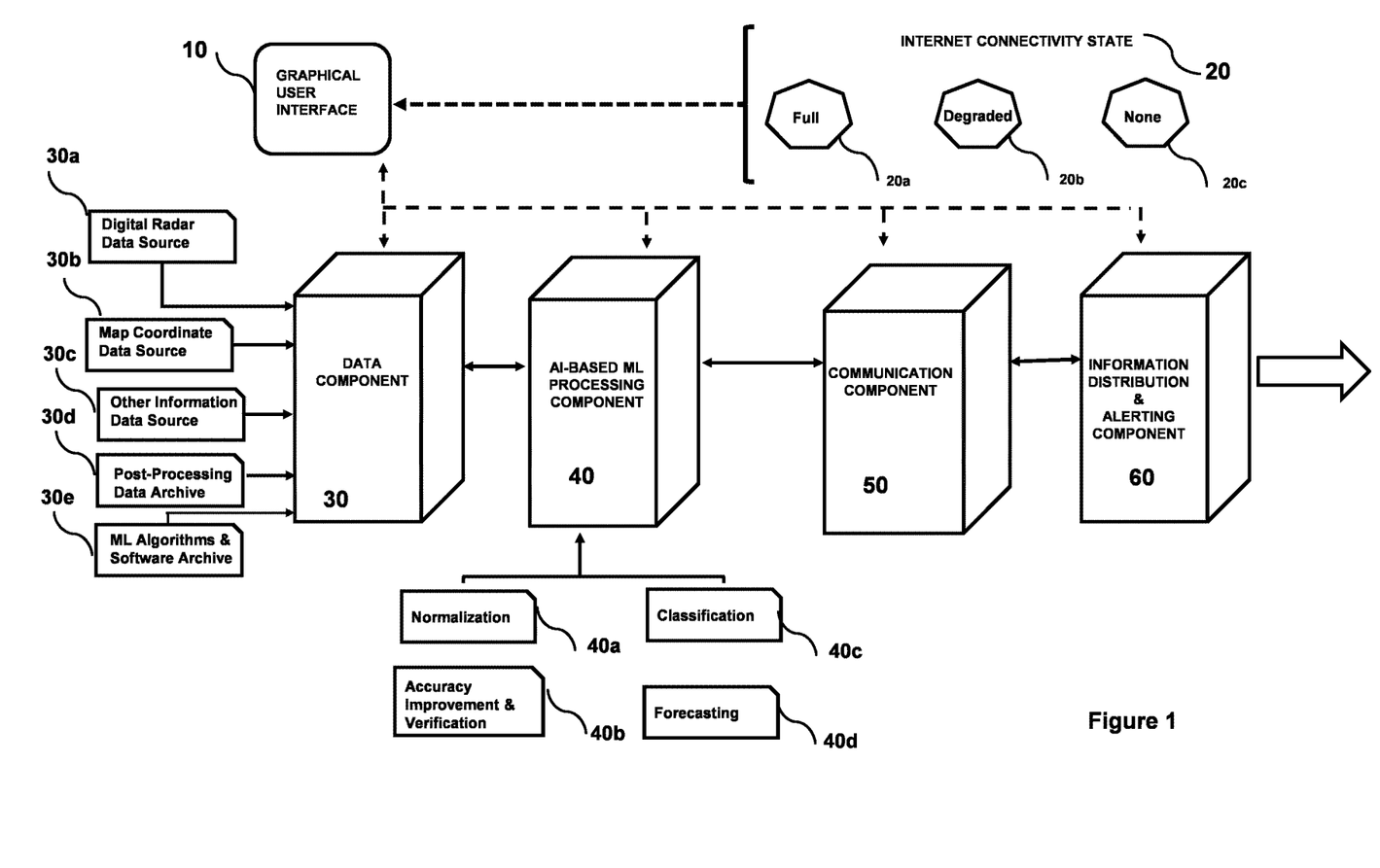
FIG. 1 is a schematic illustrating an embodiment of this component-based system for artificial intelligence-enhanced real-time aerial object classification and trajectory (state vector or orbital state vector) forecasting using digital radar signals showing how components generally operate and interact.

Referring now to the drawings, embodiments of the component-based system for rapidly generating artificial intelligence-enhanced real-time, multi-dimensional (space and time) gridded aerial object classification and vector (position, navigation, and timing) forecasts utilizing digital radar signals data collected at high rates of volume and velocity are computer implemented (10) with variable internet connectivity (20) states ranging from reliance on full internet connectivity (20a) to reliance on intermittent internet connectivity (20b) to no reliance on internet connectivity (20c) for the computer (30) to perform data storage, retrieval, manipulation, communication, processing, and end user application tasks for accurate ariel object classification and vector forecasts.

Figure 2:
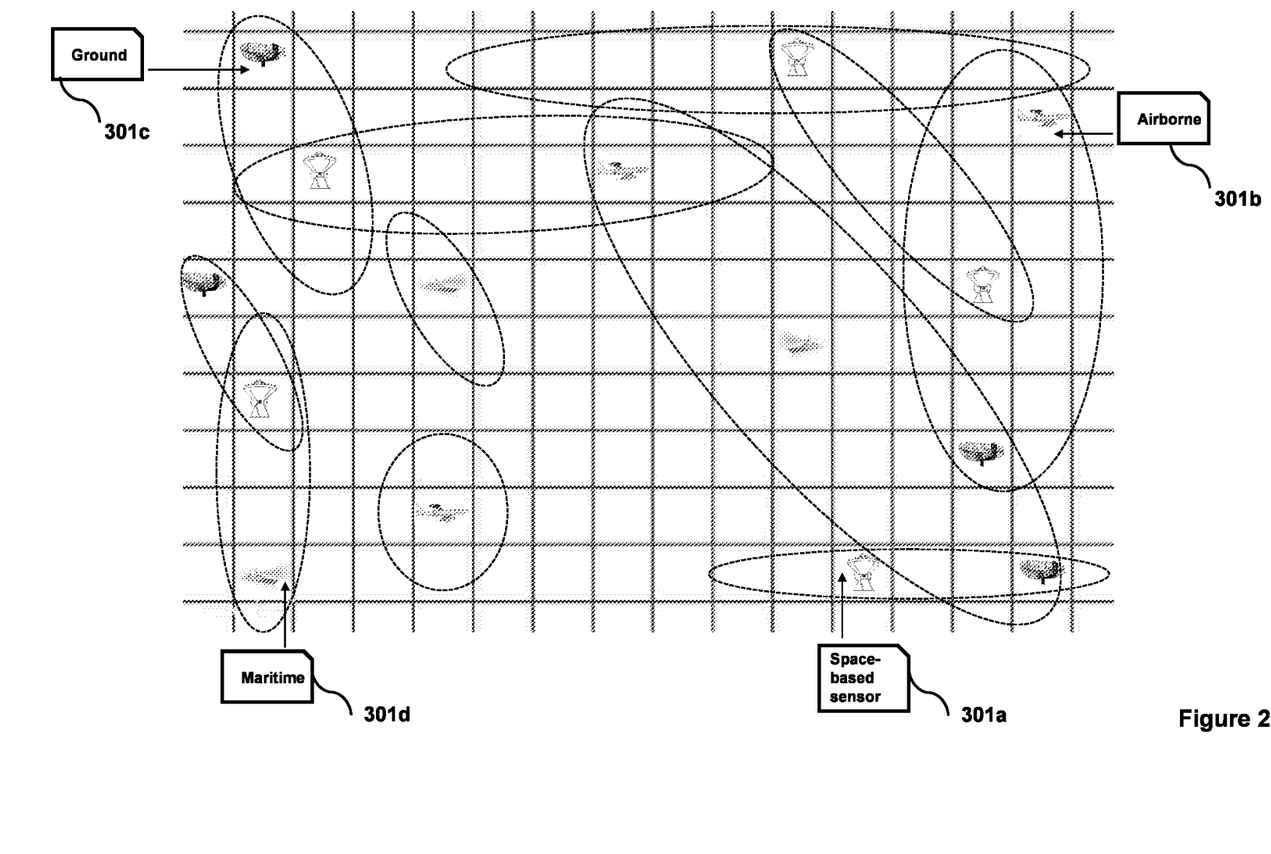
FIG. 2 depicts an illustrative portion of pro forma space-based sensors, airborne, ground, and maritime radar array locations for sensor data generation and collection overlaying a surface level static grid for spatial and temporal mapping of aerial object classifications and vector forecasts.

The data component (30) serves as a data cache involving one or more servers or external hard drives to store, retrieve, and manipulate georeferenced and time-referenced digital radar sensor data collected by a diverse suite of sensors or systems involving one or more space-based sensor radar systems (301a), airborne radar systems (301b), mobile or fixed-site ground radar systems (301c), and maritime radar systems (301d) or a combination of those radar systems. The system supports the creation of static and dynamic pre-computed filters, which eliminate from consideration erroneous or duplicative data from collected data sets. As the computational requirements increase as the number of collected data points increases, these filters provide a mechanism that substantially reduces the computational workload of the system. The system further supports the collection, pipelined processing, and use within aerial object classifications and vector forecasts of high frequency RD sensor data from a plurality of types of sensors (301a, 301b, 301c, and 301d) in real-time or near real-time utilizing a plurality of functions. Additionally, the data component of the system comprises external data sources and external databases (30b and 30c), a post-processing data archive (30d), and a ML algorithm and software archive (30e). The external database may be an instance of the system database that is provided on another server, or may be a network connected database that is a commercial or other external source.

The AI-based ML processing component (40) receives and retrieves automated georeferenced and time-referenced data within a given hyper-ellipsoid from the data component (30). It includes a data normalization module (40a), an accuracy improvement and verification module (40b), an ariel object classification module (40c), and a trajectory or vector forecasting module (40d) for manipulating the DR data arrayed spatially and temporally, including data derived from historical records, prior predictions, and interpolated values to support and enhance the accuracy of aerial object classifications and vector forecasts using DR signals rapidly and automatically.

The normalization module (40a) identifies outliers, parses, filters, and processes the collected raw data from the data component (30) to extract databases for machine learning training, analyses, and predictions. Additionally, the normalization module integrates map coordinate source data (30b), other information source data (30c) including but not limited to catalogued cislunar orbital instabilities, and the post-processing data archive (30e) with the digital radar signal source data (30a) when required for classifying aerial objects or forecasting trajectories. In some embodiments, processing of the retrieved data can include cleaning the data to remove outliers, interpolating or otherwise filling in missing data points which would otherwise have caused a failed M of N criteria, and removing erroneous or otherwise unneeded data and formatting the data in a date frame.

The accuracy improvement and verification module (40b) retrieves an untrained, partially trained, or previously trained ML model from the data component (30) and uses the training data to train or retrain the ML model, thereby generating a trained ML model, which it stores in the ML algorithms and software archive (30e). The stored ML model includes algorithms from commercially available ML toolkits as well as custom algorithms and models. Some examples of types of predictive models include (without limitation) regression models (e.g., linear regression, logistic regression), classification and regression tree models, multivariate adaptive regression spline models and other machine learning models (e.g., Naive Bayes). In an illustrative embodiment, the accuracy improvement and verification module (40b) re-trains or updates a trained ML model by retrieving the trained model from a trained model store or the data component (30) and uses data from the data component (30) to perform additional model training. In further embodiments, the accuracy improvement and verification module also directly retrieves data corresponding to features of a trained or untrained ML model from the data component (30). This retrieved data can include but is not limited to, for example, recent processed collected data and generated collected data (to include previously discarded data) to incrementally improve aerial object classification and vector forecasting as the newly collected, processed, and generated data becomes available.

The aerial object classification module (40c) and the trajectory or vector forecasting module (40d) retrieve a trained ML model and pre-processed database from the data component (30) and perform calculations to generate ariel object classifications and vector forecasts in near-real time. These projections are time stamped and stored post-processing in the data component (30) for documentation and future analyses. Each predicted value generated by the AL-based ML processing component is georeferenced for a time defined interval within a suspect ellipsoid/hyper-ellipsoid air/ground domain given spatial and temporal parameters for a suspect cluster (i.e., cluster source meeting spatial and temporal characterization parameters for a suspect target). The incorporation of AI-based ML for performing data manipulation makes it possible to generate object classification and PNT predictions encompassing manned and unmanned ariel objects operating at subsonic, sonic, supersonic, and hypersonic speeds.

The communications component (50) interacts with the other components (30, 40, 60). Communication between the components or modules is achieved through machine executable software code. The communications component transmits and receives archived data to/from the data component for manipulation by the AI-based ML processing component. It receives requests for and transmits archived data from the processing component to the information distribution and alerting component for end user application. The communications component is capable of generating a historical record of completed tasks.

The information distribution and alerting component (60) receives requests for and transmits output in the form of aerial object classifications and vector forecasts for end user application.

By way of a non-limiting example, the component-based system is used to generate an accurate classification by category for an aerial object detected by digital radar signals collected by satellite, airborne, ground, or maritime sensor platforms. Additional example, the system derives an aerial flight path or ballistically influenced parabolic solution transiting a multidimensional grid affected by naturally occurring unconstrained PNT phenomena to generate a vector forecast including manned and unmanned aerial objects operating at subsonic, sonic, supersonic, and hypersonic speeds. More specifically, categories within these speed classes include however, are not limited to: manned and unmanned (single and swarm) winged jet aviation, winged propeller aviation, rocket, spacecraft, missile, artillery, mortar, maritime vessel, and ground vehicle, etc.

In one embodiment, each component has full internet connectivity capability. The full internet connectivity state includes unconstrained satellite access for data and communication transmission. Large data transmission and manipulation using remote or cloud-based resources for data storage, processing, and post-processing end user applications is feasible. Real-time or near-real time digital radar signals data is used under normal conditions for initial input from the data component to populate the processing component to assist in real-time generation of aerial object classifications and vector forecasts for end user applications.

In other embodiments, one or more components have degraded/limited internet connectivity or non-internet connectivity conditions. The degraded internet connectivity state includes limited communications beyond local networks, exogenously derived real-time or near-real time digital radar signals data is available sporadically, and intermittent satellite access capability. Limited real-time or near-real time digital radar signals data supplemented by endogenous archived information is used for initial input from the data component to populate the processing component to assist in real-time generation of the object classification or vector forecast predictions for end user application.

The denied internet connectivity state includes no communications beyond local networks, exogenously derived real-time or near-real time digital radar signals data is unavailable, and no satellite access capability. In the degraded connectivity state, large data transmission and manipulation is difficult beyond local networks and on-site processing. Only endogenous archived information and position constant georeferenced x, y & z coordinates are used for initial input from the data component to populate the processing component to assist in real-time and perpetual generation of aerial object classification and vector forecast predictions for end user application until such time that internet connectivity is regained.

By way of a non-limiting example, the degraded internet connectivity state includes limited communications beyond local networks and loss of satellite communications. Large data transmission and manipulation will be difficult or impossible beyond local networks and on-site processing degrading the accuracy of aerial object classification or vector forecast predictions. Local, real-time surface RD data, if available, and stored data component information is utilized as entry argument information into the processing component.

While embodiments of a component-based system as described is provided for rapidly generating artificial intelligence-enhanced real-time, multi-dimensional (space and time) gridded aerial object classification and vector (position, navigation, and timing) forecasts utilizing digital radar signals data collected at high rates of volume and velocity and a method of its use have been described, modifications can be made to the details of construction without departing from the scope of this disclosure. The following claims and their recited elements and limitations include the full range of equivalents to which they are entitled.

What is claimed:

1. A system for generating an artificial intelligence-enhanced real-time, multi-dimensional gridded aerial object classification and vector forecast for one or more manned and unmanned aerial objects operating at subsonic, sonic, supersonic, or hypersonic speeds within a target grid, the system utilizing digital radar signals data and comprising:
   a data component including a data cache containing real-time or near real time pre-processed and post-processed digital radar signals data, including interpolated digital radar signals data, and archived endogenous information including prior pre-processed and post-processed digital radar signals data, position constant georeferenced x, y & z coordinates, previously discarded digital radar signals data, prior multi-dimensional gridded aerial object classifications and vector forecast predictions, and map coordinates stored in an array, each element of the array being time-referenced and geo-referenced, the data cache further comprising software containing machine learning algorithms;
   an artificial intelligence machine learning processing component including a normalization module, an accuracy improvement and verification module, a classification module, and a forecasting module and associated logic for manipulating the data cache to generate the multi-dimensional gridded aerial object classification and vector forecast, the multi-dimensional gridded aerial object classification and vector forecast including a confidence value;

an information distribution and alerting component arranged to receive the multi-dimensional gridded aerial object classification and vector forecast and present the multi-dimensional gridded aerial object classification and vector forecast in accordance with a predetermined end user requirement;

a communications component arranged to receive data requests from the artificial intelligence machine learning process component, transmit the data requests to the data component, receive requested data from the data component, and transmit the requested data to the artificial intelligence machine learning process component, the communications component further arranged to transmit the multi-dimensional gridded aerial object classification and vector forecast the predictions to the information distribution and alerting component; and a computer-implemented graphical user interface in communication with the data component, the artificial intelligence machine learning processing component information distribution and alerting component, and the communications component, the computer-implemented graphical user interface adapted to display the multi-dimensional gridded aerial object classification and vector forecast;

wherein when the system has full internet connectivity, the real-time or near-real time pre-processed and post-processed digital radar signals data is used for initial input from the data component to populate the artificial intelligence machine learning processing component; and wherein when the system has degraded internet connectivity, a subset of the real-time or near real time pre-processed and post-processed digital radar signals data, if available, and the endogenous archived information are used for initial input from the data component to populate the artificial intelligence machine learning processing component; and wherein when the system has no internet connectivity, only the endogenous archived information and the position constant georeferenced x, y & z coordinates are used for initial input from the data component to populate the artificial intelligence machine learning processing component.

2. The system of claim 1, wherein, the pre-processed and post-processed digital radar signals includes data collected by at least one system selected from the group consisting of a space-based sensors system, an airborne radar system, a mobile ground radar system, a fixed-site ground radar system, and a maritime radar system.

3. The system of claim 1, wherein the target grid lies in a range of tropospheric space to thermospheric space.

4. The system of claim 1, wherein the target grid lies in geospace.

5. The system of claim 1, wherein the target grid lies in cislunar space.

6. The system of claim 5, wherein the cislunar space is upwards of 12 GEO.

7. A method for generating an artificial intelligence-enhanced real-time, multi-dimensional gridded aerial object classification and vector forecast for one or more manned and unmanned aerial objects operating at subsonic, sonic, supersonic, or hypersonic speeds within a target grid, the method utilizing digital radar signals data and comprising:

storing in a data component a data cache containing real-time or near real time pre-processed and post-processed digital radar signals data, including interpolated digital radar signals data, and archived endogenous information including prior pre-processed and post-processed digital radar signals data, position constant georeferenced x, y & z coordinates, previously discarded digital radar signals data, prior multi-dimensional gridded aerial object classifications and vector forecast predictions, and map coordinates stored in an array, each element of the array being time-referenced and geo-referenced, the data cache further comprising software containing machine learning algorithms;

manipulating the data cache to generate the multi-dimensional gridded aerial object classification and vector forecast, the multi-dimensional gridded aerial object classification and vector forecast including a confidence value, the manipulating comprising an artificial intelligence machine learning processing component including a normalization module, an accuracy improvement and verification module, a classification module, and a forecasting module and associated logic;

receiving data requests from the artificial intelligence machine learning process component, transmitting the data requests to the data component, receiving requested data from the data component, and transmitting the requested data to the artificial intelligence machine learning process component by way of a communications component, the communications component further transmitting the multi-dimensional gridded aerial object classification and vector forecast predictions to an information distribution and alerting component; and receiving the multi-dimensional gridded aerial object classification and vector forecast in an information distribution and alerting component, the information distribution and alerting component presenting the multi-dimensional gridded aerial object classification and vector forecast in accordance with a predetermined end user requirement; and displaying the multi-dimensional gridded aerial object classification and vector forecast on a computer-implemented graphical user interface in communication with the data component, the artificial intelligence machine learning processing component information distribution and alerting component, and the communications component;

wherein under full internet connectivity, the real-time or near-real time pre-processed and post-processed digital radar signals data is used for initial input from the data component to populate the artificial intelligence machine learning processing component; and wherein under degraded internet connectivity, a subset of the real-time or near real time pre-processed and post-processed digital radar signals data, if available, and the endogenous archived information are used for initial input from the data component to populate the artificial intelligence machine learning processing component; and wherein under no internet connectivity, only the endogenous archived information and the position constant georeferenced x, y & z coordinates are used for initial input from the data component to populate the artificial intelligence machine learning processing component.

8. The method of claim 7, wherein, the pre-processed and post-processed digital radar signals includes data collected by at least one system selected from the group consisting of a space-based sensors system, an airborne radar system, a mobile ground radar system, a fixed-site ground radar system, and a maritime radar system.

9. The method of claim 7, wherein the target grid lies in a range of tropospheric space to thermospheric space.

10. The method of claim 7, wherein the target grid lies in geospace.

11. The method of claim 7, wherein the target grid lies in cislunar space.

12. The method of claim 11, wherein the cislunar space is upwards of 12 GEO.

13. Non-transitory computer readable medium comprising instructions for generating an artificial intelligence-enhanced real-time, multi-dimensional gridded aerial object classification and vector forecast for one or more manned and unmanned aerial objects operating at subsonic, sonic, supersonic, or hypersonic speeds within a target grid, the instructions utilizing digital radar signals data and:

storing in a data component a data cache containing real-time or near real time pre-processed and post-processed digital radar signals data, including interpolated digital radar signals data, and archived endogenous information including prior pre-processed and post-processed digital radar signals data, position constant georeferenced x, y & z coordinates, previously discarded digital radar signals data, prior multi-dimensional gridded aerial object classifications and vector forecast predictions, and map coordinates stored in an array, each element of the array being time-referenced and geo-referenced, the data cache further comprising software containing machine learning algorithms;

manipulating the data cache to generate the multi-dimensional gridded aerial object classification and vector forecast, the multi-dimensional gridded aerial object classification and vector forecast including a confidence value, the manipulating comprising an artificial intelligence machine learning processing component including a normalization module, an accuracy improvement and verification module, a classification module, and a forecasting module and associated logic;

receiving data requests from the artificial intelligence machine learning process component, transmitting the data requests to the data component, receiving requested data from the data component, and transmitting the requested data to the artificial intelligence machine learning process component by way of a communications component, the communications component further transmitting the multi-dimensional gridded aerial object classification and vector forecast predictions to an information distribution and alerting component; and receiving the multi-dimensional gridded aerial object classification and vector forecast in an information distribution and alerting component, the information distribution and alerting component presenting the multi-dimensional gridded aerial object classification and vector forecast in accordance with a predetermined end user requirement;

displaying the multi-dimensional gridded aerial object classification and vector forecast on a computer-implemented graphical user interface in communication with the data component, the artificial intelligence machine learning processing component information distribution and alerting component, and the communications component;

wherein when there is full internet connectivity, the real-time or near-real time pre-processed and post-processed digital radar signals data is used for initial input from the data component to populate the artificial intelligence machine learning processing component; and wherein there is degraded internet connectivity, a subset of the real-time or near real time pre-processed and post-processed digital radar signals data, if available, and the endogenous archived information are used for initial input from the data component to populate the artificial intelligence machine learning processing component; and wherein there is no internet connectivity, only the endogenous archived information and the position constant georeferenced x, y & z coordinates are used for initial input from the data component to populate the artificial intelligence machine learning processing component.

14. The non-transitory computer readable medium of claim 13, wherein, the pre-processed and post-processed digital radar signals includes data collected by at least one system selected from the group consisting of a space-based sensors system, an airborne radar system, a mobile ground radar system, a fixed-site ground radar system, and a maritime radar system.

15. The non-transitory computer readable medium of claim 13, wherein the target grid lies in a range of tropospheric space to thermospheric space.

16. The non-transitory computer readable medium of claim 13, wherein the target grid lies in geospace.

17. The non-transitory computer readable medium of claim 13, wherein the target grid lies in cislunar space.

18. The non-transitory computer readable medium of claim 17, wherein the cislunar space is upwards of 12 GEO.

* * * * *

UNITED STATES PATENT AND TRADEMARK OFFICE
CERTIFICATE OF CORRECTION

| | |
|---|---|
| PATENT NO. | : 11,714,182 B1 |
| APPLICATION NO. | : 18/063513 |
| DATED | : August 1, 2023 |
| INVENTOR(S) | : James L. Regens and Quint D. Avenetti |

It is certified that error appears in the above-identified patent and that said Letters Patent is hereby corrected as shown below:

In the Specification

Column 8, Line 3, replace "RD" with "DR"
Column 10, Line 23, replace "RD" with "DR"

Signed and Sealed this
Nineteenth Day of September, 2023

*Katherine Kelly Vidal*

Katherine Kelly Vidal
*Director of the United States Patent and Trademark Office*